United States Patent [19]

Shibata et al.

[11] Patent Number: 4,724,301
[45] Date of Patent: Feb. 9, 1988

[54] APPARATUS UTILIZING LIGHT STRIPE IMAGE FOR DETECTING PORTION TO BE WELDED PRIOR TO WELDING THEREOF

[75] Inventors: Nobuo Shibata; Kenji Mori, both of Ibaraki; Akira Hirai, Ushiku; Tsugio Udagawa, Ibaraki; Toshio Akatsu, Ushiku, all of Japan

[73] Assignee: Hitachi, Ltd., Japan

[21] Appl. No.: 900,425

[22] Filed: Aug. 26, 1986

[30] Foreign Application Priority Data

Oct. 21, 1985 [JP] Japan .................................. 60-233252

[51] Int. Cl.$^4$ .............................................. B23K 9/12
[52] U.S. Cl. ................................ 219/124.34; 318/577; 901/42; 901/47
[58] Field of Search .................. 219/124.34; 318/577; 901/42, 47

[56] References Cited

U.S. PATENT DOCUMENTS

| | | | |
|---|---|---|---|
| 4,417,127 | 11/1983 | Nachey et al. | 219/124.34 |
| 4,491,719 | 1/1985 | Corby, Jr. | 219/124.34 |
| 4,501,950 | 2/1985 | Richardson | 318/577 |
| 4,532,405 | 7/1985 | Corby, Jr. et al. | 219/124.34 |
| 4,599,506 | 7/1986 | Burke et al. | 219/124.34 |

FOREIGN PATENT DOCUMENTS 994175 2/1983 U.S.S.R. .................... 219/124.34

Primary Examiner—Clifford C. Shaw
Attorney, Agent, or Firm—Antonelli, Terry & Wands

[57] ABSTRACT

The welding position detecting apparatus incorporates a detecting portion including light emitter for emitting a light stripe onto a beveling surface of a work to be welded and a camera for receiving a reflected light from the beveling surface, a support member to which the detecting portion is mounted, which is disposed for rotation about an axis of the welding torch, and a motor for rotating the support member, whereby the detecting portion is rotated to a desired angular position about the axis of the welding torch.

17 Claims, 6 Drawing Figures

APPARATUS UTILIZING LIGHT STRIPE IMAGE FOR DETECTING PORTION TO BE WELDED PRIOR TO WELDING THEREOF

FIELD OF THE INVENTION

The invention relates to a welding position detecting apparatus of the type in which a light stripe is emitted onto a beveling surface of a member to be welded, and a welding position is detected on the basis of an image obtained by a reflection light from the beveling surface.

DESCRIPTION OF THE PRIOR ART

There has been known a welding position detecting apparatus which includes light emitting means provided adjacent a welding torch for emitting a light stripe so as to intersect a beveling surface of a member to be welded, and light receiving means, e.g. a video camera, for receiving a reflection light from the beveling surface whereby a welding position is detected by analyzing an image or optical pattern image obtained by the light receiving means. Such detecting apparatus is disclosed in U.S. Pat. Nos. 4,491,719 and 4,543,405.

According to the above described prior art apparatus, a detecting portion including the light emitting means and the light receiving means is integrated with a welding torch into a torch body. When such detecting apparatus is applied to a welding robot to perform a position control for making the welding torch flow a specified zone to be welded, the detecting apparatus is mounted on a distal end of the robot arm as a part of a welding torch assembly into which the detecting apparatus including the light emitting and receiving means is integrated with the welding torch. In this arrangement, the light emitting means and the light receiving means are adapted only to emit a laser beam onto a restricted area of the beveling surface and to monitor the image therefrom, respectively. In a case, therefore, the welding positions significantly deviate from an operational direction of the welding torch, there arises a necessity to oscillate the light emitting means integrated with the light receiving means in any direction without altering an arc point for a correct detection of the beveling surface on a workpiece. Since, however, a welding cable including a conduction cable and a gas cable, and a signal cable extend into the welding torch assembly mounted on the distal end of the robot arm, these cables move together with the welding torch assembly upon an oscillation thereof. Accordingly, a motor for oscillating the welding torch assembly is subject to an increased load, which may adversely affect the accuracy of positioning the robot, resulting in deterioration of the accuracy of welding profile. Furthermore, a restriction on the configuration or the attitude of the work to be welded may result from such arrangement of the cables attached as described above.

OBJECTS AND SUMMARY OF THE INVENTION

An object of the invention is to provide a welding position detecting apparatus which is capable of detecting welding positions with high accuracy no matter how the welding position on the work may be altered. Another object of the invention is to provide a welding position detecting apparatus in which a welding position detecting portion can be rotated about an axis of the welding torch.

To this end, the welding position detecting apparatus according to the invention comprises a support member mounted for rotation about an axis of a welding torch, light emitting means and light receiving means mounted on the support member, and driving means for rotating the support member about the axis of the welding torch. The drive means comprises a motor and a transmission mechanism to transmit a torque from the motor to the support member.

Other objects and features of the invention will become clear from the following description.

Figure 1:
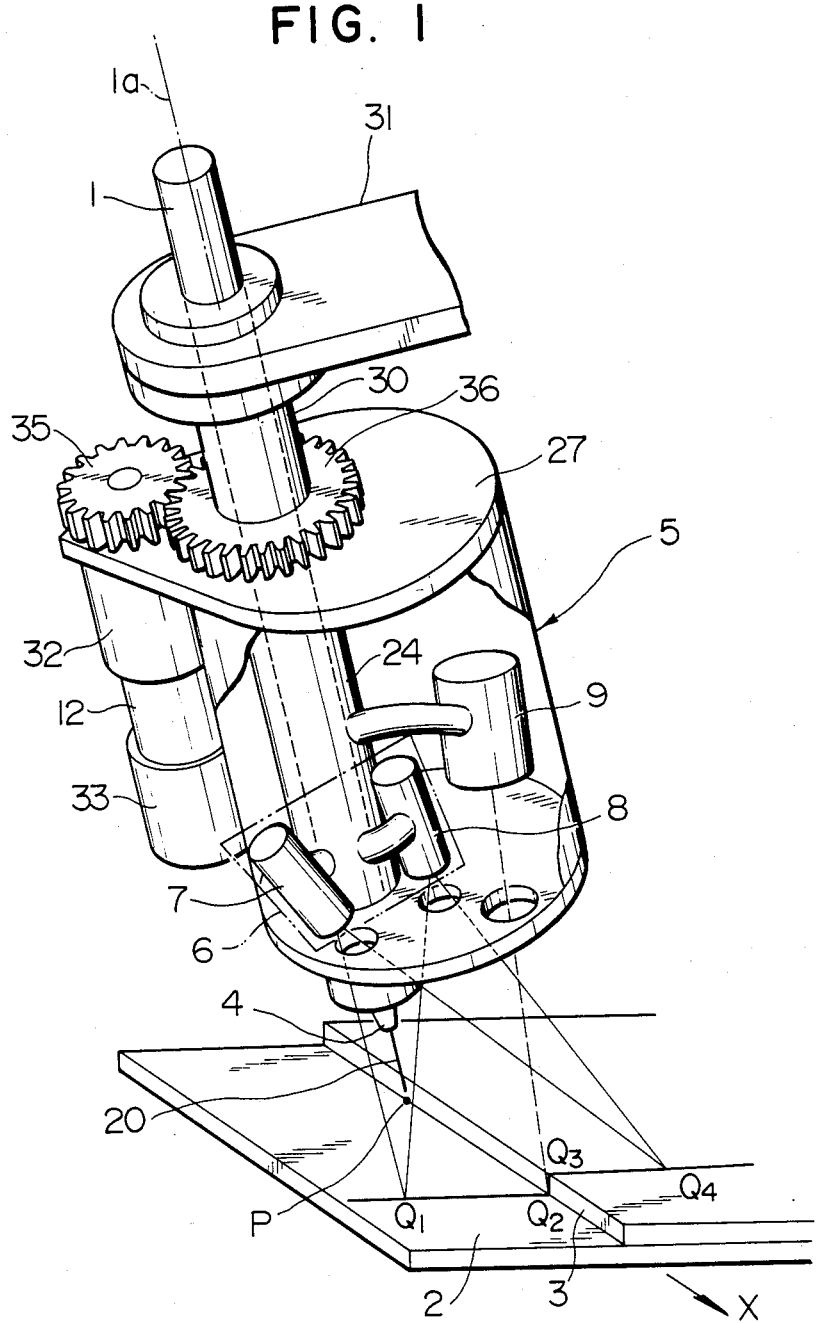
FIG. 1 is a schematic perspective view showing one embodiment of the invention.

DESCRIPTION OF THE PREFERRED EMBODIMENTS;

The invention will now be described with reference to the accompanying drawings. Referring to FIG. 1, a welding torch 1 has an electrode portion 4 facing the beveling surface 3 of a work 2 to be welded, and generates an electric arc therebetween. A support member 5 is disposed encircling the welding torch 1 for rotating about an axis 1a of the welding torch 1. The support member 5 is provided with light emitting means 6 and light receiving means 9. The light emitting means 6 has a first light emitting portion 7 and a second light emitting portion 8, each of which emits a linearly converged light ray (light stripe) onto a portion of the work 2 adjacent and ahead of an arc point P on the beveling surface 3 of the work 2 in such manner that one light stripe is partially overlapped with the other one. In the drawing, the segment $Q_1$–$Q_4$ represents an overlapped part on the beveling surface 3 by the light stripes from the above light emitting portions 7 and 8. The light receiving means 9 may be, for example, an industrial television camera, which monitor the overlapped part and detect a welding profile line. A motor 12 is mounted on a motor supporting portion 27 provided on an upper part of the support member 5, on a rotary shaft of which a gear 35 is carried. On the contrary, there is provided, below a mounting bracket 31 for the welding torch 1, a stationary gear 36 fixed on the welding torch 1. Both of the gears 35 and 36 are in mesh with each other so that there is provided a transmission mechanism to transmit a torque from the motor 12 to the support member 5. That is, as the motor 12 is driven, the gear 35 revolves around the stationary gear 36 with the result that the support member 5 rotates about the axis of the welding torch 1. Since the light emitting means 6 and the light receiving means 9 are mounted on the support member 5, the means 6 and 9 rotate together with the support member 5. In another words, it is possible to rotate or oscillate the light emitting and the light receiving means 6 and 9 about the axis of the welding torch 1 with the torch 1 being maintained stationary.

Figure 2:
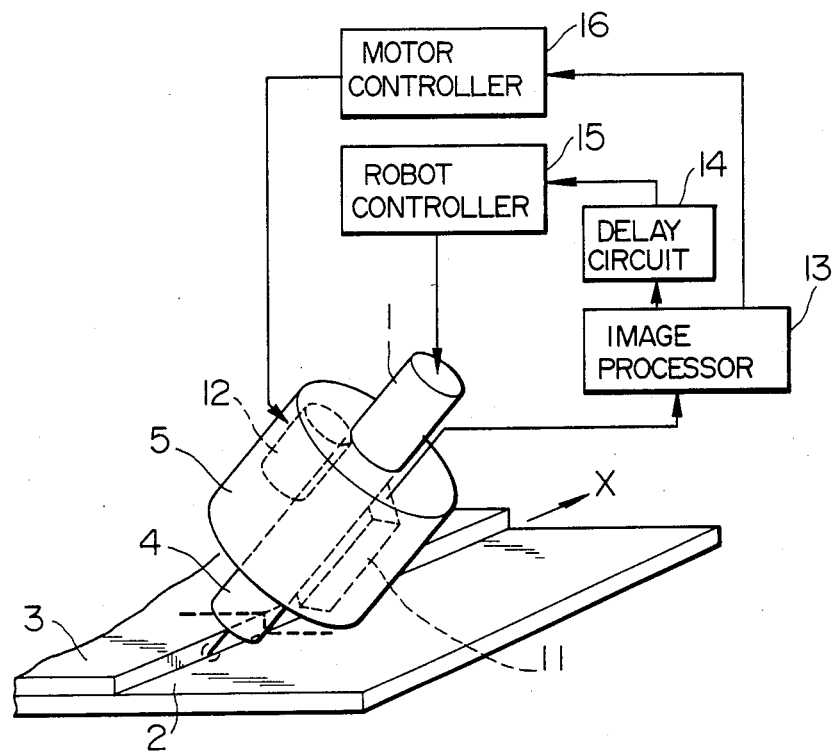
FIG. 2 is a schematic block diagram showing an full-automatic arc-welding robot to which a detecting apparatus according to the invention is applied.

FIG. 2 shows a full-automatic arc-welding robot to which the apparatus shown in FIG. 1 is applied. A detecting portion 11 is mounted on the support member 5, which accomodates therein the light emitting means 6 including the first and the second light emitting portions 7 and 8, and the light receiving means 9. The support member 5 is rotated about the axis of the welding torch 1 by the motor 12. Signals of the optical pattern image of the beveling surface from the detecting portion 11 are input to an image processor 13 where an image processing is performed in a predetermined manner to detect the beveling position. The position signals from the processor 13 are subjected to a delay processing through a delay circuit 14 and output to a robot controller 15. The robot controller 15 controls a positioning of the welding torch 1 in accordance with the delay processed data on the beveling position.

As mentioned before, when the drive motor 12 is rotated to revolve the support member 5 around the welding torch 1, the detecting portion 11 also revolves with the support member 5 around the welding torch 1 integratedly. Accordingly, it is made possible that the detecting position of the beveling surface is selectively positioned on a point of any circle concentric with the axis of the welding torch 1. To describe more specifically, it is arranged that on monitoring of the images fed into the image processor 13, the extent or frequency of the welding line moving out of sight is fed successively to a motor controller 16, and accordingly the motor 12 is so controlled as to follow any change of the welding profile line to detect a beveling image. This will now be described in further detail.

Figure 3:
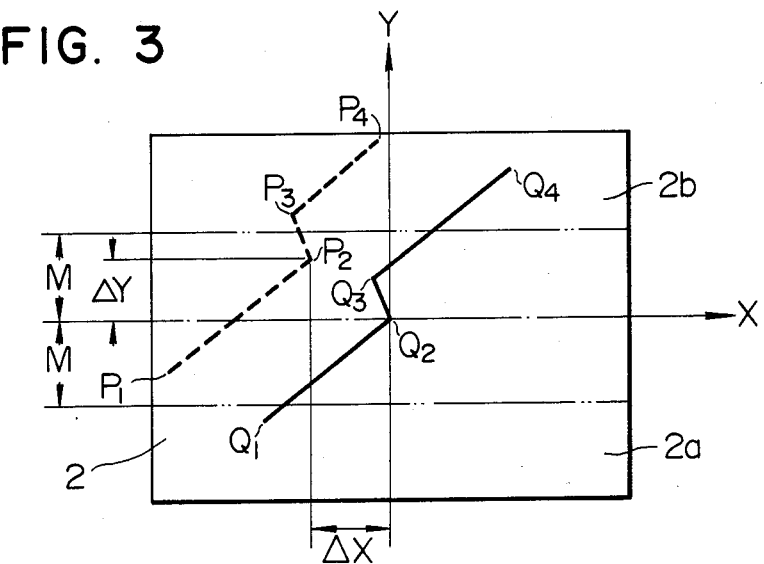
FIG. 3 is a view description of the principle of control of the detecting direction according to the invention.

FIG. 3 shows an optical pattern image for a member 2 to be welded with overlapping plates 2a and 2b. The segment $\overline{Q_1Q_2}$ of the optical pattern image indicated by the solid line represents an optical pattern image provided on an upper surface of the lower plate 2a. The segments $\overline{Q_2Q_3}$ and $\overline{Q_3Q_4}$, respectively, are also optical pattern images provided on an end surface and an upper surface of the upper plate 2b. It is possible, to obtain a position of the beveling portion $Q_3$ from these images on the condition that the positional relation between the detecting portion 11 and the robot carrying the apparatus including the detecting portion 11 is known. According to the data on the beveling position, as mentioned earlier, the delay circuit 14 executes the predetermined delay processing and feeds the processed signals to the robot controller 15 for control of the torch position.

As shown in FIG. 1, the segment $\overline{Q_1Q_2Q_3Q_4}$ is perpendicular to a direction X of the welding profile. Since the light emitting portions 7 and 8 of the light emitting means 6 and the light receiving means 9 are all disposed rotatable about an axis extending in the direction X (called "X-axis" hereinafter), the observed optical pattern image includes relative to an axis extending in a direction Y perpendicular to the direction X (called "Y-axis" hereinafter), as shown in FIG. 3. When executing the detection of the beveling position, the image may be displaced, as shown for example by the broken line in FIG. 3, depending on the attitude changes among the light emitting means 6, the light receiving means 9 and the welding torch 1, or the relative position changes among the light emitting means 6, the light receiving means 9 and the beveling position. It is noted, in this Figure, that ΔX is provided mainly as a result that the light emitting and the light receiving means 6 and 7 and the welding torch 1 are rotated around the X-axis relative to the member 2 to be welded. The ΔY represents a change of beveling position with respect to an orientation of the light receiving means 9. In order that the beveling portion image is always within an observational field of view, it is necessary not only to control the attitude of the robot through detection of changes of ΔX but to control of the light emitting means 6 and the light receiving means 9 with respect to the detecting direction in response to a deviation ΔY of the beveling position.

According to the invention, in order to perform the latter control i.e. control of the light projecting and receiving means, there is set a predetermined tolerable deviation M of the detected position M on a monitor screen. If the successively calculated values ΔY exceeds the tolerance M, the drive motor 12 is activated to oscillate the support member 5 for control of the rotating direction of the detecting portion 11 including the light emitting and the light receiving means 6 and 9.

As described above, the invention is featured to be capable of performing profile detection of the beveling portion in a manner that the beveling image is always confined within the observational field. Accordingly, this enables a detection in response to a three-dimensional deviation of the beveling position regardless of the configuration or the attitude of the work to be welded. The invention thus can be useful more than the conventional method.

Figure 4:
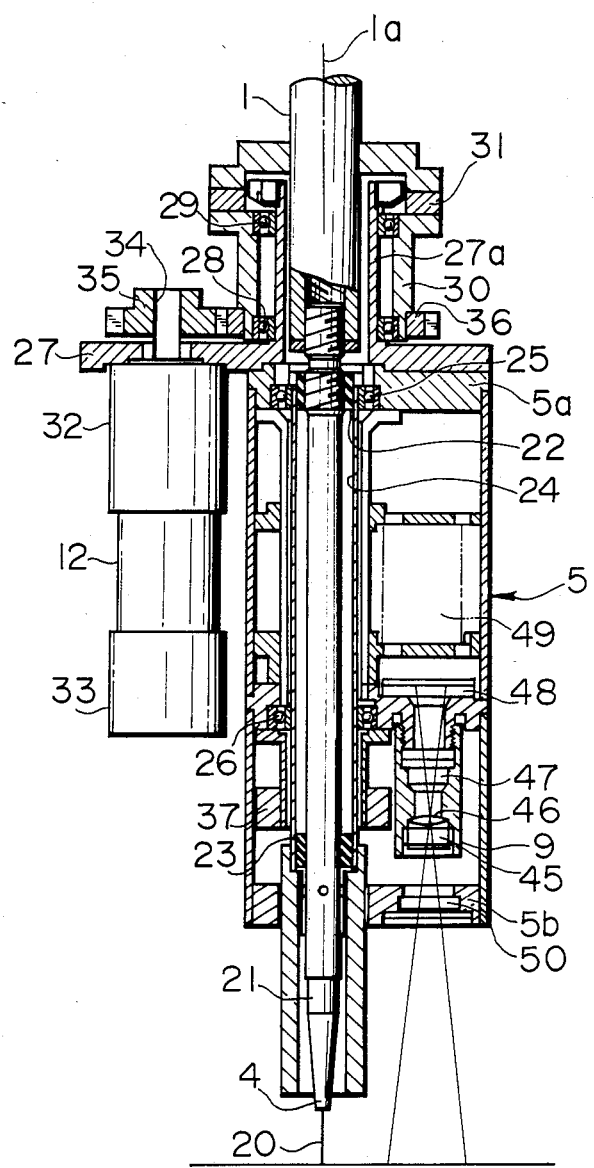
FIG. 4 is a longitudinal sectional view showing another embodiment the invention.
Figure 5:
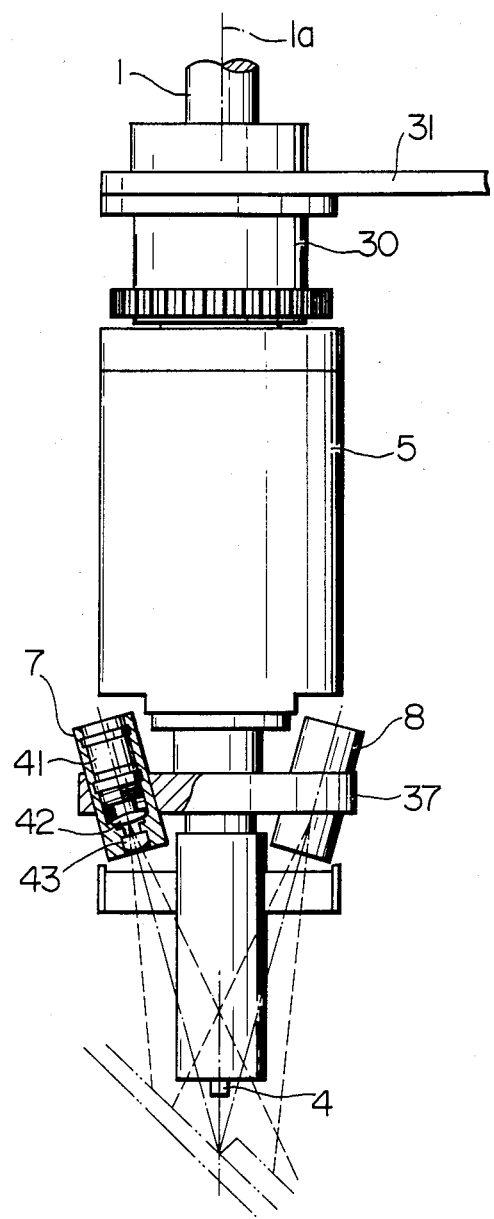
FIG. 5 is a side view of the embodiment shown in FIG. 4.

The invention will now be described of its further specific construction with reference to FIGS. 4 and 5, wherein FIG. 4 is longitudinal sectional view of the robot and FIG. 5 is a side view of the robot as viewed from a right side of FIG. 4.

The welding torch 1 extends through a first cylindrical member 24 through insulator members 22 and 23, which includes an electrode portion 4 having a support electrode 21 with a welding wire 20 carried at the distal end of the electrode 21. The support member 5 is provided in an interior thereof with a hollow cylindrical portion, and is rotatably mounted on an outer periphery of the cylindrical member 24 of the torch 1 through bearings 25 and 26. A motor mounting member 27 for the drive motor 12 upper support plate 5a of the support member 5. The motor mounting member 27 has a cylindrical portion 27a which is rotatably supported on a secondary cylindrical member 30 and on a fitting 31 for a robot arm through bearings 28 and 29.

The motor mounting member 27 carries at outside of the support member 5 a drive motor 12, a reduction gear 32 and an encoder 33. The gear 35 is secured to an output shaft 34 of the reduction gear 32. The gear 35 is in meshing engagement with the stationary gear 36 secured on the cylindrical portion 27a of the mounting member 27. The first and the second light emitting portions 7 and 8 constituting the light emitting means 6 for emitting light beams are mounted on a carrying member 37 which is integrally rotated with the support member 5. The first and the second light emitting portions 7 and 8 are so disposed substantially in symmetry to each other with respect to the welding torch 1 that the light stripes therefrom are aligned to each other to form a straight line. The first emitting portion 7 includes a light emitting element 41, a condenser lens 42 for providing the light stripe from the element 41 with a directivity, and a cylindrical lens 43. The second light emitting portion 8 is constructed similarly to the first light emitting portion 7.

Within the support member provided is the light receiving means 9 for an image monitoring. The light receiving means 9 includes a band pass filter 45 for passing only the light having the same wavelength as that of the emitted light from the emitting elements 41 of the first and the second light emitting portions 7 and 8, a lens 46, an aperture stop 47, a detector 48 and a circuit 49 for activating the detector 48. Further, a lower support plate 5b of the support member 5 is provided with a transparent heat-resisting glass 50 disposed in an optical path from the light receiving means 9.

With such arrangement described above, when the drive motor 12 is actuated, a torque is fed from the motor 12 to the gear 35 through the reduction gear 32. Since the gear 36 in mesh with the gear 35 is integral with the second cylindrical member 30 to be remained stationary, the torque from the motor 12 causes the revolution of the mounting member 27 with the support member 5 secured thereto around the welding torch 1, which carries the gear 35, the motor 12, the reduction gear 32 and the encoder 33.

Accordingly, it is also possible to rotate the light emitting and the light receiving means 6 and 9 carried by the support member 5 around the welding torch 1 upon rotation of the support member 5 while the welding cable connected to the welding torch 1, the signal cable, support electrode and the welding wire are maintained stationary.

In this embodiment of the invention, furthermore, there are provided a pair of contactless switches (not shown) such as magnetic sensors or optical sensors, for setting up reference positions, each located on the side of the rotatable assembly (including the light emitting and the light receiving means) and on the side of the stationary assembly (including the welding torch, the welding cable, signal cable, etc). With this arrangement, it is impossible to execute a detection of the beveling position after recognization of the reference position at the start of the operation of the apparatus. Accordingly, it is possible to program an algorithm for detection and for control of the beveling position without any malfunction.

In the embodiment described above the light emitting means 6 includes the first and the second light emitting portions 7 and 8. The reason therefor lies in that with a only single light emitting portion, the optical pattern image produced by the light from the single light emitting portion is shadowed by the welding torch 1. Two light emitting portions, therefore, are intentionally provided on either side of the welding torch 1 so as to eliminate the shadow of the welding torch 1. Alternatively, however, the light emitting means with the single emitting portion may be applicable in the single emitting portion is so disposed that the shadow of the welding torch does not cross the light pattern.

According to the construction described above, the subsystem for emitting a light stripe and for monitoring of the reflection thereof is rotatable around the axis of the welding torch while the torch is stationary. Accordingly, it is possible to alter a point of detection for welding with the point of arc generation being fixed. This assures an execution of profile welding with high accuracy, and is effective in that the apparatus is applicable to any work having a complicated configuration or attitude. In a rotation of the detecting apparatus there will be no reaction from the welding cable or the signal cable connected to the welding torch, since such cables are connected to the stationary part and not coiled. Accordingly, it is possible to reduce a load acting ont he robot arm during the control of positioning. This is effective in attainment of highly accurate profile welding.

Finally, as shown in FIGS. 4 and 5, due to the fact that the drive motor is disposed opposite to the optical subsystem with respect to the axis of the welding torch, the apparatus on the whole keeps balance in weight, reducing the necessary torque of the drive motor while the entire apparatus is compact in design. The invention thus exhibits a significant effect especially when applied to a full-automatic arc-welding robot.

Figure 6:
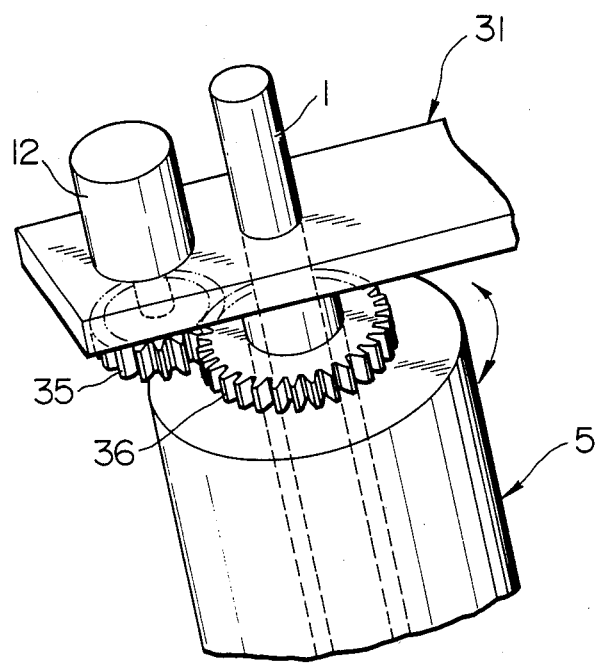
FIG. 6 is a fragmentary perspective view showing a still another embodiment in which the motor is mounted on the stationary side.

In the embodiment described above, the drive motor 12 is mounted on the support member 5. However, the invention is not limited to such arrangement but the drive motor 12 may alternatively be attached to the mounting bracket 31 (i.e. to the stationary part) on which the torch is secured. That is, as shown in FIG. 6, it may be possible that the motor 12 is attached to the mounting bracket 31 and the support member 5 is rotated around the axis of the welding torch 1 through a transmission mechanism (including the gear 35 secured to them motor shaft and the mating gear 36 provided on the support member 5).

Also, the above transmission mechanism is not limited to a gearing device described in the above embodiment, but it may be an assembly of paired friction rollers or of the pulley-belt combination type.

As apparent from the above disclosure of the invention, the invention makes it possible to arbitrarily rotate the light emitting and the light receiving means around the axis of the welding torch to any desired extent of angular displacement. Hence, it can be assured to accurately detect the welding position on the work to be welded constantly under the optimum conditions.

What is claimed is:

1. An apparatus for detecting a position to be welded utilizing processing of an image input of a light stripe comprising:

a welding torch;

a mounting member on which said welding torch is mounted;

a support member provided for rotation around an axis of said welding torch;

light emitting means attached to said support member for emitting a light stripe onto a beveling surface portion of a work in front of a welding portion of the work at which an arc is generated by said welding torch so that the light stripe crosses a welding direction along which said welding torch moves;

light receiving means attached to said support member, said light receiving means having a field of view including the beveling surface portion and receiving a reflected light of said light stripe from said beveling surface portion and providing an image signal indicative thereof; and motor means;

a transmission mechanism for transmitting a driving force from said motor means to said support member to rotate said support member around the axis of said welding torch;

image processor means for calculating a position to be welded on said beveling surface portion in response to the image signal detected by said light receiving means, and for calculating and outputting a control signal to rotate said support member so as to make the field of view of said light receiving means include said position to be welded on said beveling surface portion when a difference between a portion of the field of view of said light receiving means and said position to be welded exceeds a predetermined limit; and motor controller means for receiving said controlled signal from said image processor means and controlling said motor means in accordance with said controlled signal.

2. An apparatus according to claim 1, wherein said motor means is attached on said support member.

3. An apparatus according to claim 2, wherein said transmission mechanism includes a stationary gear mounted around a cylindrical periphery portion of said mounting member and another gear secured on a rotating shaft of said motor means for meshing with said stationary gear.

4. An apparatus according to clai 1, wherein said motor means is attached on said mounting member.

5. An apparatus according to claim 4, wherein said transmission mechanism includes a gear secured to support member and being coaxial with said welding torch, and a gear attached on the rotating shaft of said motor means for meshing with said secured gear.

6. An apparatus according to claim 1, wherein said support member defines therein a cylindrical cavity to which said welding torch is inserted, and is carried for rotation around the axis of said welding torch through bearing means provided on an outer periphery of said welding torch within said inner cavity.

7. An apparatus according to claim 1, wherein said light emitting means includes a first light emitting portion and a second light emitting portion arranged in symmetry to each other with respect to said welding torch.

8. An apparatus according to claim 1, wherein said light emitting means includes a light emitting element, a condenser lens for converging light from said light emitting element and a cylindrical lens for converting said converged light into a light stripe.

9. An apparatus according to claim 1, wherein said support member is attached through bearing means to said mounting member for rotation around the axis of said welding torch.

10. An apparatus according to claim 1, wherein said light emitting means includes only one light emitting portion.

11. An apparatus for detecting a position to be welded utilizing processing of an image input of a light stripe comprising:
a welding torch;
a mounting member on which said welding torch is mounted;
a cylindrical hollow portion mounted to an outer periphery of said welding torch through an insulator;
a support member rotatably carried at an outer periphery of said cylindrical hollow portion through bearing means;
light emitting means attached to said support member for emitting a light stripe onto a beveling surface portion of a work ahead of a welding portion of the work in which an arc is generated by said welding torch so that te light stripe crosses a welding direction along which said welding torch moves;
light receiving means attached to said support member for receiving a reflected light of said light stripe from said beveling surface portion and for providing an image signal indicative thereof;
motor means for generating a driving force for rotation of said support member around an axis of said welding torch;
image processor means for calculating a position to be welded on said beveling surface portion in response to the image signal detected by said light receiving means, and for calculating a control signal to rotate said support member so as to make a field of view of said light receiving means include said portion to be welded on said beveling surface portion when a portion of the field of view of said light receiving means is displaced from said portion to be welded by at least a predetermined amount;
motor controller means for receiving said control signal from said image processor means and controlling said motor means in accordance with said control signal.

12. An apparatus according to claim 11, wherein said drive means includes a motor and a transmission mechanism for transmitting a rotational torque from said motor to said support member.

13. An apparatus according to claim 12, wherein said motor is attached to said support member.

14. An apparatus according to claim 12, wherein said motor is attached on said mounting member for said welding torch.

15. An apparatus according to claim 12, wherein said transmission mechanism includes a gearing arrangement.

16. An apparatus according to claim 11, wherein said light emitting means includes a first light emitting portion and a second light emitting portion disposed in symmetry to each other with respect to said welding torch.

17. An apparatus according to claim 11, wherein said light emitting means includes only one light emitting portion.

* * * * *